(12) United States Patent
Chapel et al.

(10) Patent No.: US 8,512,863 B2
(45) Date of Patent: Aug. 20, 2013

(54) AQUEOUS DISPERSIONS OF HYBRID COACERVATES DELIVERING SPECIFIC PROPERTIES ONTO SOLID SURFACES AND COMPRISING INORGANIC SOLID PARTICLES AND A COPOLYMER

(75) Inventors: Jean-Paul Chapel, Bordeaux (FR); Mikel Morvan, Pessac (FR); Ling Qi, Orleans (FR)

(73) Assignees: Rhodia Inc., Cranbury, NJ (US); Centre Nationale de la Recherche Scientifique, Paris (FR)

( * ) Notice: Subject to any disclaimer, the term of this patent is extended or adjusted under 35 U.S.C. 154(b) by 74 days.

(21) Appl. No.: 11/827,343

(22) Filed: Jul. 11, 2007

(65) Prior Publication Data
US 2008/0248209 A1  Oct. 9, 2008

Related U.S. Application Data

(60) Provisional application No. 60/830,036, filed on Jul. 11, 2006.

(51) Int. Cl.
| | |
|---|---|
| *B05D 3/02* | (2006.01) |
| *C08K 3/08* | (2006.01) |
| *C08K 3/22* | (2006.01) |
| *C08L 77/00* | (2006.01) |

(52) U.S. Cl.
USPC ........... 428/408; 524/437; 524/440; 524/441; 524/430; 524/493; 524/608; 427/385.5

(58) Field of Classification Search
USPC ................. 428/408; 524/437, 440, 441, 430, 524/493, 608; 427/385.5
See application file for complete search history.

(56) References Cited

U.S. PATENT DOCUMENTS

| 3,657,003 A | 4/1972 | Kenney |
| 5,344,588 A | 9/1994 | Chane-Ching .................. 516/89 |
| 6,153,705 A | 11/2000 | Corpart et al. ................ 525/244 |
| 6,783,621 B1 | 8/2004 | Georges et al. ............... 156/173 |

(Continued)

FOREIGN PATENT DOCUMENTS

| WO | WO 98/01478 | 1/1998 |
| WO | WO 98/58974 | 12/1998 |

(Continued)

OTHER PUBLICATIONS

Berret et al. Soft Materials. 2004. vol. 2, Nos. 2&3 pp. 71-84.*

(Continued)

*Primary Examiner* — Liam Heincer
*Assistant Examiner* — Michael A Salvitti
(74) *Attorney, Agent, or Firm* — Novak Druce Connolly Bove + Quigg, LLP (57) ABSTRACT

The present invention is directed to a process for the preparation of an aqueous dispersion of coacervates having a core-shell structure, the core (a) being an inorganic particle being anionic or cationic and the shell (b) being a copolymer wherein said copolymer comprises at least two parts, A and B, part A being cationic if particle (a) is anionic, and anionic if particle (a) is cationic, and part B being neutral in pH conditions of said dispersion. More particularly, the invention is directed to treating compositions comprising that aqueous dispersion of coacervates delivering antifouling, water sheeting, antisoiling, anti-adhesion, adhesion, anti-deposition, and/or anti-UV properties onto all kinds of surfaces.

22 Claims, 1 Drawing Sheet

(56) References Cited

U.S. PATENT DOCUMENTS

| | | | |
|---|---|---|---|
| 6,933,340 B2 | 8/2005 | Herve et al. | 524/522 |
| 7,208,554 B2 | 4/2007 | Wo et al. | |
| 7,235,231 B2 | 6/2007 | Bavouzet et al. | 424/70.16 |
| 7,468,413 B2 * | 12/2008 | Yokota et al. | 524/403 |
| 7,495,033 B1 | 2/2009 | Chane-Ching | |
| 2003/0121214 A1 * | 7/2003 | Ishibashi | 51/309 |
| 2004/0029978 A1 | 2/2004 | Chane-Ching | |
| 2005/0176863 A1 * | 8/2005 | Yokota et al. | 524/403 |
| 2006/0167154 A1 | 7/2006 | Bousseau et al. | |
| 2006/0241008 A1 | 10/2006 | Baker et al. | |
| 2006/0276371 A1 * | 12/2006 | Schreiner et al. | 510/475 |
| 2009/0163639 A1 | 6/2009 | Berret et al. | |
| 2009/0283711 A1 | 11/2009 | Chapel et al. | |
| 2009/0321660 A1 * | 12/2009 | Samuel et al. | 250/459.1 |

FOREIGN PATENT DOCUMENTS

| | | | |
|---|---|---|---|
| WO | WO 01/38225 A1 | | 5/2001 |
| WO | WO 03/099942 A1 | | 12/2003 |
| WO | WO 2005/030282 | * | 4/2005 |
| WO | WO 2006/072743 A2 | | 7/2006 |

OTHER PUBLICATIONS

Berret et al. J. Am. Chem. Soc. 128 1755-1761.*

Yu et al. Colloids and Surfaces A: 243 (2004) pp. 49-52.*

Seghal et al (Langmuir 2005, 21, 9359-9364).*

Euliss et al. (Nano Letters 2003 vol. 3, No. 11, pp. 1489-1493).*

Schmolka, A Review of Block Polymer Surfactants, J. Am. Oil Chem. Soc. 1977, 54, 110-116.

Wilczek-Veraet et al., Individual Block Length Distributions of Block Copolymers of Polystyrene-block-Poly(a-methylstyrene) by MALDI/TOF Mass Spectrometry, Macromolecules 1996, 29, 4036-4044.

Katayose and Kataoka, Water Soluble Polyion Complex Between DNS and PEG-Poly (L-Lysine) block Copolymer for Novel Gene Vector, Proc. Intern. Symp. Control. Rel. Bioact. Materials, 1996, 23, 899-900.

Quirk and Lee, Experimental Criteria for Living Polymerizations, Polymer International 27, 359 (1992) 359-367.

Qi et al, Redispersible Hybrid Nanopowders: Cerium Oxide Nanoparticle Complexes with Phosphonated-PEG Oligomers, ACS Nano, May 3, 2008, (abstract)(online, [retrieved on Jun. 26, 2009]. Retrieved from the internet: <URL:http://pubs.acs.org/doi/abs/10.1021/nn700374d> <DOI: 10.1021/nn700374> <http://arxiv.org/ftp/arxiv/papers/0804.3410.pdf>.

U.S. Appl. No. 12/387,829—Non-final Office Action mailed Jan. 5, 2011.

U.S. Appl. No. 12/387,829 to Chapel et al.—Notice of Allowance mailed Aug. 16, 2011.

* cited by examiner

AQUEOUS DISPERSIONS OF HYBRID COACERVATES DELIVERING SPECIFIC PROPERTIES ONTO SOLID SURFACES AND COMPRISING INORGANIC SOLID PARTICLES AND A COPOLYMER

CROSS-REFERENCE TO JOINT RESEARCH AGREEMENT

The claimed invention was made under a joint research agreement by or on the behalf of parties, Rhodia Inc, and Centre Nationale de la Recheche Scientifique (CNRS), to a joint research agreement, within the meaning of 35 U.S.C. 103(c)(3), which was in effect on or before the date the claimed invention was made, and the claimed invention was made as a result of activities undertaken within the scope of the joint research agreement.

FIELD OF THE INVENTION

This invention relates to aqueous dispersions of hybrid coacervates delivering specific properties onto solid surfaces and comprising inorganic solid particles and a copolymer.

BACKGROUND OF THE INVENTION

Hydrophilizing low energy surfaces, in particular hydrophobic surfaces, to achieve a better wetting/adhesion is a key technological issue encountered in many industrial fields (such as automotive, paints, coatings, ink printings, and fluidics). Related properties like antifouling, antisoiling, water sheeting, anti-UV are also in a great need, more particularly in household and Home care. This issue is generally handled by physisorbing or chemisorbing a functional layer onto the solid surface. The final surface properties will then strongly depend on physical (such as size, developed surface area, spatial organization, and physical interactions) and chemical features (such as nature of the core/shell, surface physical-chemistry: functionalities, and groups, charges of the adsorbed entities (such as particles, and macromolecule).

The large variety of functional polymers available in industry enables in principle the functionalization of a large range of substrates. However, the direct adsorption of functional macromolecules onto a surface is usually very selective: a hydrophilic negatively charged surface can only be functionalized by neutral or cationic (or combination of both) polymers; the functionalization of a hydrophobic surface is hard to achieve with charged species and needs at least some hydrophobic components. For example, a polyelectrolyte or a neutral-charged copolymer will adsorb strongly on a high energy ceramic or metallic surfaces, bringing the expected functionality. However, it will not efficiently work on low energy polymeric materials like polystyrene (PS).

A second important problem when dealing with adsorbed layers is their weak resistance toward cleaning, rinsing and aging. For hydrophilic polymers, the interaction with reactive or high energy surfaces (oxide layers, ceramics, metals . . . ) is quite strong (electrostatic and hydrogen bonding interactions . . . ) and the adsorbed layer is anchored efficiently on the surface. This is not the case with hydrophobic and inert polymer surfaces, where only Van der Waals forces are acting to promote the adsorption. In this case the macromolecules, soluble in water, are easily removed with further rinsing.

A goal of the invention is to provide a more general way that does not rely on the physical-chemistry of the substrate.

An another goal is to develop aqueous dispersions or solutions of hybrid coacervates which can deliver the different desired functionalities, more particularly antifouling, water sheeting, antisoiling, anti-deposition, and anti-UV properties onto all kinds of surfaces, no matter what the physical or chemical nature of the surface is.

Another goal is to provide dispersions or solutions of hybrid coacervates as neutral as possible to be able to adsorb on all kinds of surfaces.

Another goal is to provide a process for the preparation of such aqueous dispersions or solutions of hybrid coacervates having the above mentioned properties.

Another goal is to provide a treating composition of such surfaces comprising said aqueous dispersions or solutions.

SUMMARY OF THE INVENTION

These goals and others are achieved by the present invention directed to a process for the preparation of an aqueous dispersion or solution of coacervates having a core-shell structure, the core (a) being an inorganic particle being anionic or cationic and the shell (b) being a copolymer wherein said copolymer comprises at least two parts, A and B, part A being cationic if particle (a) is anionic, and anionic if particle (a) is cationic, and part B being neutral in pH conditions of said dispersion or solution, said process comprising the steps of:

a) preparing an aqueous colloidal dispersion of said stabilized inorganic particles whose concentration Ca by weight is equal to or less than about 2% and more than 0.001%, and setting its pH at a value of pHa b) preparing a solution of the copolymer whose concentration Cb by weight is equal to or less than about 2% and more than 0.001% with:

$$Ca \times 0.95 \leq Cb \leq Ca \times 1.05$$

and setting its pH at a value of pHb with:

$$pHa-2 \leq pHb \leq pHa+2,$$

with the further proviso that the stoichiometric ratio Z of chargeable groups present in the solution is between 0.80 and 1.2 optionally 0.95 and 1.05 and more preferably about 1, with:

$$Z:=[S] \times s/[P] \times p$$

wherein [S] and [P] are the molar concentrations of the particle and the copolymer and s and p being the number of charge per particle and per copolymer, and c) mixing a) and b) in order to obtain the dispersion or solution.

Preferably, the concentration by weight of the inorganic particles and the copolymer is between 0.1 and 1, and $$Ca \times 0.099 \leq Cb \leq Ca \times 1.01$$

$$pHa-1 \leq pHb \leq pHa+1, \text{ and}$$

Z is 1 or about 1, and the mixing of a) and b) is carried out in one shot. The inorganic particle can be cerium, aluminum, zirconium, phosphorus, gallium, germanium, barium, strontium, yttrium, antimony, cesium, zirconium, or aluminum oxide, with a particle size greater than or equal to about 1 nm and less than or equal to about 100 nm, more typically between 1 and 100 nm, and, optionally, between 2 and 20 nm. In one embodiment, the characteristic particle size is the mean particle diameter ("$D_{50}$"), as determined by dynamic light scattering.

In a particular embodiment, the inorganic particle is a rare-earth metal, optionally cerium, said particle being further stabilized with:

an acidic complexing agent with three or more functional groups, optionally citric acid, or a water-soluble or water-dispersible polymer obtained by polymerizing at least one monomer corresponding to an ethylenically unsaturated, linear or branched, aliphatic, cyclic or aromatic monocarboxylic or polycarboxylic acid, or anhydride; or obtained from the polymerization of at least one ethylenically unsaturated, linear or branched, aliphatic, cyclic or aromatic, monocarboxylic or polycarboxylic acid, or anhydride.

The part A of the copolymer b) can be polyionic and part B is neutral in the pH conditions of said dispersion of coacervates.

The part A of the copolymer b) can be polycationic and part B is neutral in pH conditions of said dispersion of coacervates.

Polyelectrolyte/neutral copolymers coupled with an oppositely charged surfactant, polyelectrolyte or charged nanoparticles form coacervates above a certain $Z_c$ generally above 0.1, where Z is the stoichiometric ratio of the chargeable groups as above defined. Based on this definition, Z=1 would represent an isoelectric solution, which is a solution characterized by the same number densities of positive and negative chargeable ions.

In some cases it may be not easy to estimate Z when the number of charges per particle are unknown or when the copolymer of the shell is a complicated one. In such case the mixing ratio X, between the inorganic particle solutions and the block copolymer solutions, considered to have a correlation with the charge ratio Z is used. X is preferably defined as:

$$X = \frac{\text{Volume of particle base solution at } C_0}{\text{Volume of polymer solution at } C_0}$$

Any suitable mixing ratio X and initial concentration $C_0$ may be used. In accordance with this formula, the mixed specimens are preferably prepared in the range of X=0.01 to 100 at the total concentration C=0.1% to 10%. In order to prepare the mixed solution at a desired concentration $C_0$, the two initial solutions should be prepared at the same concentration $C_0$.

Solutions at constant concentration by weight $C_0$ but with different Z (or X) are then analyzed by static and dynamic light scattering in order to localize a peak in the curve Rayleigh ratio $R_\theta$ versus z or X. where the complexes are supposed to be neutral.

Static and dynamic light scattering are performed on a Brookhaven spectrometer (BI-9000AT auto-correlator) for measurement of the Rayleigh ratio $R_\theta$ at 90° and of the collective diffusion coefficient D for the dispersions of particles and solutions of copolymers at different concentrations by weight. The hydrodynamic radius of the colloidal complexes is calculated according to the Stoke-Einstein relation:

$$R_h = k_B T / 6\pi\eta_0 D(c \to 0)$$

wherein $k_B$ is the Boltzmann constant, T the temperature (T=298K), and $\eta_0$ the solvent viscosity ($\eta_0 = 0.89 \cdot 10^{-3}$ Pa s).

BRIEF DESCRIPTION OF THE DRAWINGS

These and other features and advantages of the invention will be better understood from the following detailed description, which is provided in connection with the accompanying drawing.

Figure 1:
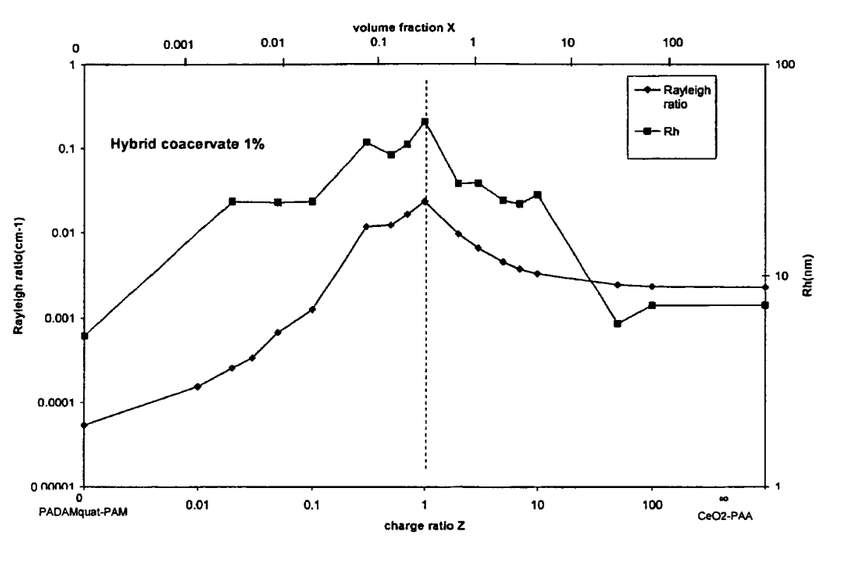
FIG. 1 is a schematic of scattering properties of mixed solutions of Padamqua-Pam copolymers and oppositely charged CeO2-PAA nanoparticles: evolution of Rayleigh ratio ($R_\theta$) and Hydrodynamic radius ($R_h$) as a function of charge ratio (Z) and volume fraction (X) at 1% wt as illustrated in example 1.

The curves of Rayleigh ratio $R_\theta$ and hydrodynamic radius $R_h$ as a function of Z (and X) are plotted on the same graph and the peak in the rayleigh ratio $R_\theta$ obtained for a for a value of X=0.86 corresponds well to predicted value of Z=1.

DESCRIPTION OF INVENTION AND PREFERRED EMBODIMENTS

Inorganic Particles

The inorganic particles (a) can be anionic or cationic. Preferably, the particles are cationic. The inorganic is preferably a metal and more preferably an oxide thereof. In that connection, substantially any "metal" capable of forming a metal oxide may be used to form the metal oxide particles. Suitable metallic elements include, among others, niobium, indium, titanium, zinc, iron, zirconium, aluminum, tin, cerium, hafnium, tantalum, tungsten, and bismuth. Also suitable in place of the metal in the oxide is the semi-metallic compound, silicon and its various oxides such as silicates.

The metal oxides may be made of a single metal, or may be a combination of metals, such as cerium, aluminum, zirconium, phosphorus, gallium, germanium, barium, strontium, yttrium, antimony, and cesium. Preferred metal oxide particles comprise ferric oxide ($Fe_2O_3$), zirconium oxide, aluminum oxide and cerium oxide. The metal oxide particles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts.

The terms "aqueous dispersions of inorganic particles" mean all systems formed of fine solid inorganic particles, more particularly of metal oxides particles having colloidal sizes, in suspension in an aqueous which may be different or identical to the liquid medium used to redisperse the powder of the instant invention. The term particle used in the instant specification encompasses discrete particles or aggregates of particles. Colloidal sizes refer to particle sizes of between 1 nm and 5000 nm. It should be noticed that in the above defined dispersion, metal oxide may be in a colloidal form or in the form of ions and colloids at the same time.

According to one aspect of the invention, the particles of the dispersion can be used without being stabilized if stable in the pH conditions of the process of the instant invention. These bare particles are for example described in U.S. Pat. No. 5,344,588. Most of the time the particles are further stabilized before being added to the copolymer in order to prevent them from aggregating, precipitating and keep them in a stable state in a wide range of pH, that range preferably including the pH values close to neutrality (around pH 7).

According to the instant invention it is recommended to further stabilize the inorganic particles with an acidic complexing agent, with three or more functional groups, more particularly citric acid, as taught in WO 03/01595, or a polyacrylic polymer.

Preferred colloidal dispersion of inorganic particles are dispersions wherein the metal is a rare-earth metal, preferably cerium, said particle being stabilized with a water-soluble or water-dispersible polyacrylic polymer obtained by polymerizing at least one monomer corresponding to an ethylenically unsaturated, linear or branched, aliphatic, cyclic or aromatic monocarboxylic or polycarboxylic acid, or anhydride; or obtained from the polymerization of at least one ethylenically unsaturated, linear or branched, aliphatic, cyclic or aromatic, monocarboxylic or polycarboxylic acid, or anhydride.

Such stabilized colloidal dispersions are described in PCT/FR2006/000018 to Berret et al, published as WO 2006/072743, which entered the US National Stage as US Patent Application Publication 2009/163639 A1, which issued as U.S. Pat. No. 7,868,076 B2, whose description is incorporated by reference in the present description.

Rare Earth Particle (a)

As used herein, the term "rare earth(s)" is understood to mean the elements of the group consisting of yttrium and elements of the Periodic Table with an atomic number of between 57 and 71 inclusive. Mention may more particularly be made, among rare-earths, of yttrium, lanthanum, neodymium, praseodymium, gadolinium, and cerium.

Aggregates of rare earth particles are formed from rare earth particles. In essence, smaller sized rare earth base particles are used to obtain well defined larger rare earth particles or aggregates. Accordingly, ultrafine rare earth base particles may be used to form rare earth nanoparticles. Preferably a smaller sized rare earth base particle having a hydrodynamic diameter of about 10 nm or less is used to make rare earth aggregates in accordance with the invention. The rare earth base particle may be formed of any suitable rare earth composition. Rare earth oxides, for example yttrium oxide, cerium oxide, and zirconium oxide may be used to synthesize suitable rare earth salts. Particularly exemplary rare earths include yttrium, lanthanum, gadolinium, lutecium, cerium, zirconium, and terbium.

Block Copolymer (b)

The block copolymer (b) preferably comprises at least two different blocks, block A, and block B, part A being polyionic and part B being neutral in pH conditions of said aqueous dispersion of coacervates. Copolymer (b) can be any suitable polymer. For example, copolymer (b) may be a block copolymer or comb copolymer. Preferably, block copolymers in accordance with the invention comprise at least two blocks described herein as part A and part B, whereby part A corresponds to one block, and part B corresponds to another block. Part A may also optionally comprise a composition gradient. Preferably, comb copolymers or grafted copolymers, in accordance with the invention comprise a backbone and side chains, described herein as part A and part B, whereby part A corresponds to the backbone and part B corresponds to side chains, or vice versa.

Part A is usually defined by the repeating units it comprises. A part may be defined by naming a polymer, or by naming monomers it is derived from. In the present specification, a unit deriving from a monomer is understood as a unit that may be directly obtained from the said monomer by polymerizing. Part A may be a copolymer, comprising several kind of repeating units, deriving form several monomers. Hence, part A and part B are different polymers, deriving from different monomers, but they may comprise some common repeating units (copolymers). Part A and part B preferably do not comprise more than 50% of a common repeating unit (derived from the same monomer).

Preferably, part A is polyionic (polyanionic or polycationic) in pH conditions of the formulation. That means that part A comprises ionic (anionic or cationic) repetitive units regardless of the pH, or that part A comprises repetitive units that may be neutral or ionic (anionic or cationic) depending on the pH of the formulation (the units are potentially ionic). A unit that may be neutral or ionic (anionic or cationic), depending on the pH of the composition, will be thereafter referred to as an ionic unit (anionic or cationic), or as a unit deriving from an ionic monomer (anionic or cationic), whenever it is in a neutral form or in an ionic form (anionic or cationic).

Suitable copolymer are described in US published application 2005/0176863 and in U.S. application Ser. No. 11/445,115 filed on Jan. 6, 2006, U.S. Pat. No. 6,933,340, both applications and patent being also incorporated by reference in the present description.

In a particular embodiment of the invention, part A is polycationic and comprises units derived from cationic monomers. Some preferred cationic monomers comprise an ammonium group of formula —$NR_3^+$, wherein R, which is identical or different, represents a hydrogen atom, an alkyl group comprising 1 to 10 carbon atoms, or a benzyl group, optionally carrying a hydroxyl group, and may comprise an anion (counter-ion). Examples of anions are halides such as chloride and bromides, sulphates, hydrosulphates, alkylsulphates (for example comprising 1 to 6 carbon atoms), phosphates, citrates, formates, and acetates.

Examples of suitable cationic monomers include but are not limited to aminoalkyl (meth)acrylates, aminoalkyl (meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;

diallyldialkyl ammonium salts;

their mixtures, their salts, and macromonomers deriving from therefrom.

Specific examples of cationic monomers include:

dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;

ethylenimine, vinylamine, 2-vinylpyridine, 4-vinylpyridine;

trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS, or Padamquat) chloride, trimethylammonium ethyl (meth)acrylate (also called 2-(acryloxy)ethyltrimethylammonium, TMAEAMS, or Padamquat) methyl sulphate, trimethyl ammonium propyl (meth)acrylamido chloride, vinylbenzyl trimethyl ammonium chloride, diallyldimethyl ammonium chloride, monomers having the following formula:

wherein $R_1$ is a hydrogen atom or a methyl or ethyl group;

$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;

m is an integer from 1 to 10, for example 1;

n is an integer from 1 to 6, preferably 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups;

X, which are identical or different, represent counter-ions, and their mixtures, and macromonomers deriving therefrom.

In another embodiment of the invention, part A is polyanionic and comprises units deriving from anionic monomers.

Examples of suitable anionic parts, are parts comprising units derived from anionic monomers selected from the group consisting of:

alpha-ethylenically-unsaturated monomers comprising a phosphate or phosphonate group, alpha-ethylenically-unsaturated monocarboxylic acids, monoalkylesters of alpha-ethylenically-unsaturated dicarboxylic acids, monoalkylamides of alpha-ethylenically-unsaturated dicarboxylic acids, alpha-ethylenically-unsaturated compounds comprising a sulphonic acid group, and salts of alpha-ethylenically-unsaturated compounds comprising a sulphonic acid group.

Preferred anionic parts include, but are not limited to, parts derived from at least one anionic monomer selected from the group consisting of:

acrylic acid, methacrylic acid, salts of acrylic acid, salts of methacrylic acid, vinyl sulphonic acid, salts of vinyl sulphonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS), and salts of SS.

Part B is preferably neutral in pH conditions of the formulation. Accordingly, units which make up part B are preferably neutral whatever the pH.

Examples of neutral parts are parts comprising units derived from at least one monomer selected from the group consisting of:

alkyl oxides, such as ethylene oxide, and propylene oxide, acrylamide, methacrylamide, amides of alpha-ethylenically-unsaturated, preferably mono-alpha-ethylenically-unsaturated, monocarboxylic acids, esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate, polyethylene and/or polypropylene oxide (meth)acrylates (i.e. polyethoxylated and/or polypropoxylated (meth)acrylic acid), vinyl alcohol, vinyl pyrrolidone, vinyl acetate, vinyl versatate, vinyl nitriles, preferably comprising from 3 to 12 carbon atoms, acrylonitrile, vinylamine amides, vinyl aromatic compounds, such as styrene, and mixtures thereof.

Parts that are ionic in the pH conditions of the formulation are usually considered as water-soluble. Thus, part A is usually considered as water-soluble. In a preferred embodiment of the invention, part B is water-soluble, or hydrophilic. Water-solubility of a part refers to the water-solubility that said part would have without the other part(s) that is the water-solubility of a polymer consisting of the same repeating units than said part, having the same molecular weight. By water-soluble part, polymer or copolymer, it is meant that the part, polymer or copolymer does not phase separate macroscopically in water at a concentration from 0.01% and 10% by weight, at a temperature from 20° C. to 30° C.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a part polymer at each of the ends of another part polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the parts are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, free-radical polymerization controlled by dithioesters according to the teaching of Application WO 98/01478, block copolymers obtained by a living or controlled free-radical polymerization process may comprise at least one transfer agent group at an end of the polymer chain. In particular embodiment such a group is removed or deactivated.

living or controlled free-radical polymerization processes involve using a transfer agent, and implementing addition of different monomers to obtain block copolymers.

The preferred transfer agents for implementing the controlled polymerization process are dithioesters, thioethers-thiones, dithiocarbamates, or xanthates. The preferred polymerization is the living radical polymerization using xanthates.

The average molecular weight of block copolymer (b) is preferably comprised between 1000 and 500,000 g/mol. It is more preferably less than 100,000 g/mol, and further more preferably between 15,000 and 50,000 g/mol. Within these ranges, the weight ratio of each block may vary. It is however preferred that each block has a molecular weight above 500 g/mol, and preferably above 1000 g/mol.

A polymer solution in accordance with the invention may be prepared by adding the desired amount of polymers in a powder form to deionized water, preferably having a conductivity of MΩ (Purification ion-exchange filter, Millipore). The polymer and water are preferably mixed for about 24 hours to achieve homogeneity with a concentration preferably in the range of between about 1% or less. The solution may be neutralized using any suitable neutralizer, preferably an ammonium hydroxide solution. The apparent pKa for acrylate parts in PAA are known to be around 5.5. In order to sufficiently charge PAA groups, the polymer solutions were neutralized at pH 7 by adding a 1N to 5N sodium hydroxide solution.

The process and composition according are useful for treating hard surfaces such as glass panels. This treatment can be carried out by means of the various known techniques. Mention may be made in particular of the techniques for cleaning glass panels by spraying them with a jet of water using machines of Karcher® type.

The amount of part copolymer introduced will generally be such that, during the use of the composition, after optional dilution, the concentration is between 0.001 g/l and 2 g/l, preferably from 0.005 g/l to 0.5 g/l.

The instant invention also relates to a process for the treatment of a hard surface in order to deliver to said surface antifouling, water sheeting, antisoiling, anti-adhesion adhesion, and/or anti-deposition properties, comprising the steps of:
a) coating on said surface a film of a dispersion or a solution of an aqueous dispersion or solution of hybrid coacervates having a core-shell structure made by the process of the invention, and
b) allowing the water to evaporate.

In one embodiment, a process for the providing a radiation absorbing coating on a surface, comprising the steps of:
a) coating on said surface a film of a dispersion or a solution of an aqueous dispersion or solution of hybrid coacervates having a core-shell structure made by the process of the present invention, and
b) allowing the water to evaporate.

In each case, the surface treatment is durable and resists desorption from the substrate in the presence of water.

The inorganic particle component of the hybrid coacervate provide radiation absorbtion properties to the coating made therefrom and containing such inorganic particle component. The radiation absorbing properties of the coating can be tuned by selection of the inorganic particle component of the hydrid coacervates from which the coating is made. For example, cerium oxide, TiO2, and $Fe_2O_3$, each absorb radiation in the ultraviolet range and a coating derived from a hybrid coacervate containing cerium oxide, $TiO_2$, and/or $Fe_2O_3$, particles provides ultraviolet radiation absorbing properties. Radiation absorbing coatings are useful, for example, to protect an underlying substrate, such as a synthetic polymer substrate, from radiation, such as ultraviolet radiation.

The process and composition according to the invention are useful for treating walls of showers and bath tubs in PMMA (polymethylmetacryate) or outside window- or door frames in PVC.

The process and composition according the invention are also useful for treating and cleaning ceramics (tiles, baths, sinks, etc.).

In this case, the composition advantageously comprises from 0.02% to 5% by weight of coacervate complex relative to the total weight of said composition, as well as at least one surfactant.

Surfactants that are preferred are nonionic surfactants, in particular the compounds produced by condensation of alkylene oxide groups as described above which are of hydrophilic nature with a hydrophobic organic compound which may be of aliphatic or alkyl aromatic nature.

The length of the hydrophilic chain or of the polyoxyalkylene radical condensed with any hydrophobic group may easily be adjusted to obtain a water-soluble compound which has the desired degree of hydrophilic/hydrophobic balance (HLB).

The amount of nonionic surfactants in the composition of the invention is generally from 0% to 30% by weight and preferably from 0% to 20% by weight.

An anionic surfactant may optionally be present in an amount of from 0% to 5% and advantageously 1% to 3% by weight.

It is also possible, but not obligatory, to add amphoteric, cationic or zwitterionic detergents to the composition of the present invention for cleaning hard surfaces.

The total amount of surfactant compounds used in this type of composition is generally between 1.5% and 10% and preferably between 1% and 5% by weight, relative to the total weight of the composition. One composition which is particularly suitable for this purpose comprises from 0.05% to 5% coacervate complex by weight according to the invention.

The composition for cleaning toilet pans according to the invention can also comprise a thickener such as a gum, in particular a xanthan gum introduced at a concentration of from 0.1% to 3%, as well as one or more of the following minor ingredients: a preserving agent intended to prevent the growth of microorganisms in the product, a dye, a fragrance and/or an abrasive agent.

Some illustrative but non-limiting examples are provided hereunder for the better understanding of the invention.

Example 1

Ceria nanoparticles stabilized with a 2K poly(acrylic) acid chains ($CeO_2$-PAA) are prepared according to example 1 of PCT/FR2006/000018 to Berret et al, published as WO 2006/072743, which entered the US National Stage as US Patent Application Publication 2009/163639 A1, which issued as U.S. Pat. No. 7,868,076 B2. Approximately 40 PAA chains (2 k) are bound to the ceria surface ($M_w$=420 kg/mol from static light scattering). Considering that half of the negative charges of PAA are involved in the complexation with the positive charges of bare $CeO_2$, 556 charges are estimated on each nanoparticle when the pH of the solution is above 7 with a fully ionization of PAA.

The complexing agent is the cationic-neutral diblock Padamquat-b-PAM (Poly (trimethylammonium ethyl acrylate methyl sulfate)-b-PolyAcrylamide) also known as TMAE-AMS-b-PAM having a number average molecular weight of 11K-30K (41K total). Padamquat-b-PAM is a copolymer prepared according to the teaching of example 2 of U.S. Pat. No. 6,933,340. The 11 K Padamquat block bears 41 cationic charges.

Knowing the molecular weight and the (molar) number of charges of both components it is then possible to figured out the molar concentration of both component in order to get a charge ratio Z=1. Individual aqueous solutions of both nanoparticles and copolymers are then made accordingly between 0.1 and 1%/w.

The pH of both solutions is neutralized at pH=7 by adding ammonium hydroxide. The two solutions are then mixed together in one shot to keep Z as constant as possible and stirred overnight leading to a final solution concentration equal to previous stock solutions. For a final solution concentration of 1%/w, 9.22 g of a 1%/w solution of nanoceria-PAA is mixed with 10.74 g of a 1%/w solution of Padamquat-Pam.

Another method is used to set the dispersion of ceria and the solution of the copolymer at the right values of X, Y and Z by preparing different dispersions and solutions having identical concentrations by weight of ceria and copolymers.

Then, light Scattering properties are carried out wherein the evolution of Rayleigh ratio ($R_\theta$) and Hydrodynamic radius ($R_h$) as a function of charge ratio (Z=R/S) at different concentrations and FIG. 1 illustrates the chart obtained at a concentration of 1% wt for both the dispersion and the solution.

After neutralizing at pH=7 and mixing these dispersion and solution in one shot, a solution of a hybrid coacervate with a core-shell structure is obtained. The core contains the nanoparticles of Ceria wrapped with the charged polyelectrolyte blocks and the outer shell is made out from the neutral part of the diblock copolymer. These structures contain 25 to 35 nanoparticles in the core and have a typical sizes ranging from 70 to 100 nm in diameter.

Example 2

Ceria nanoparticles stabilized with citric acid ($CeO_2$-citric acid) are prepared according to example 7 of WO 01/38255. The complexing agent is the cationic-neutral diblock Padamquat-b-PAM (Poly (trimethylammonium ethyl acrylate methyl sulfate)-b-PolyAcrylamide) also known as TMAE-AMS-b-PAM having a number average molecular weight of 11K-30K (41K total). Padamquat-b-PAM is a copolymer prepared according to the teaching of example 2 of U.S. Pat. No. 6,933,340. The 11 K Padamquat block bears 41 cationic charges. The number of accessible anionic charges around a ceria particle (molecular weight ~380 kg/mol) is 200. The coacervate formulation is made at Z=1 for a concentration of 0.1%/w using the same light Scattering method as described in above example 1.

Example 3

A bare nanoceria nanoparticles sol stable below pH<1.5 is used as cationic elementary bricks for the core. That sol is prepared according to the teaching of example 1 of U.S. Pat. No. 5,344,588. The sol has a molecular weight of 340 kg/mol and around 559 cationic charges per particle.

The complexing agent is an anionic-neutral diblock PSSNa-b-PAM (sodium Poly (styrene sulfonate)-b-PolyAcrylamide) prepared according to the teaching of example 3 of U.S. Pat. No. 6,933,340 and having a number average molecular weight of SS 7K-AM 30K (37K total). The styrene sulfonate monomer molecular weight being 206 g/mol, a 7K chain contains then 34 monomer units and therefore 34 anionic charges.

The coacervate formulation is made at Z=1 for a concentration of 0.1%/w using the same protocol as described in above example 1. The only difference is that the initial mixing is made at pH=1.5 where the nanoceria sol is stable. Indeed, the diblock aqueous solution is made at pH=1.5 by adding nitric acid to DI water. The solutions are then mixed together and stirred overnight. The pH is then neutralized by adding ammonium hydroxide.

Example 4

A. Durability

The solution of a 0.1% by weight of (a) hybrid coacervates with a core-shell structure made according to Example 1 above and (b) organic coacervates made in a manner analogous to that used to make the hybrid coacervates, except that sodium dodecyl sulfate was substituted for the ceria nanoparticles of the hybrid coacervates, were each applied on a hydrophilic hard surface (silica) and on a hydrophobic hard surface (thin spin coated polystyrene layer substrates). The water of the solution was allowed to evaporate and the adsorption of the respective coacervates was measured with a Reflectometer having a liquid cell with a stagnation point. The results show that the coacervates adsorbed on both kind of surfaces (>1.0 mg/m$^2$ in both cases). The treated substrates were each rinsed with deionized water (having a pH of about 6). Results are summarized in Table I below.

TABLE I

|  | Substrate | Organic Coacervate | Hybrid Coacervate |
|---|---|---|---|
| Initial adsorbed amount (mg/m$^2$) | PS | 1.3 | 1 |
|  | Silica | 1.2 | 1.1 |
| Adsorbed amount after 5 minute rinse (mg/m$^2$) | PS | 0.1 | 0.9 |
|  | Silica | 0.3 | 10 |
| Desorption (%) | PS | 92 | 10 |
|  | Silica | 75 | 10 |

The layer of the hybrid coacervate remained on both kinds of surfaces after rinsing. The results indicate that, compared to analogous coatings made from the organic coacervates, coatings made from hybrid coacervates exhibited enhanced resistance to desorption upon rinsing and thus enhanced durability.

B. Anti-Fouling Effect

Surfaces treated with the hybrid coacervates according to the present invention exhibit anti-fouling properties, whereby adsorbtion of further materials onto the treated surface is discouraged.

Two model globular proteins that is, Bovine Serum Albumine ("BSA") (15 kDalton, with an IEP (protein isoelectric point) of 4-5) and lysozyme (25 kDalton, IEP of 10-11), each obtained from Aldrich, were used to test the anti-fouling properties of a layer formed from the hybrid coacervates. Control experiments show that both proteins (solution concentration of 0.01 g/l or 10 PPM) adsorb strongly on silica and polystyrene surfaces, typically in an amount of greater than or equal to about 1.5 mg protein per square meter of substrate surface and the adsorbed proteins are typically not desorbed at all upon rinsing with water.

After adsorption of a hybrid coacervate solution made according to Example 1 above (from a 0.1 by weight solution onto a silica or a polystyrene surface), the further non-specific adsorption of either BSA or lysozyme to the hybrid coacervate treated surface was almost fully prevented (in each case, the adsorbtion was less than about 0.1 mg protein/m$^2$ substrate surface).

C. Anti-Soiling Effect

A coacervate solution obtained in above example 1 (0.1%/w) is diluted to concentrations ranging between 200 ppm and 1 wt % through the addition of a 2 wt % solution of a nonionic APG surfactant (alkyl polyglucoside surfactant), glycolic acid, and or water. Final APG concentrations are always 1 wt % and pH is kept at 2.3 or 9, respectfully.

The primary test is a soap scum rinse test in which black ceramic tiles are cleaned with ethanol and divided in half. One half is treated with a 1 wt % solution of APG at pH 2.3 (contains 2% glycolic acid) and the other half with the coacervate/APG mixtures. Treatment application consists of dropping 5 drops onto the tile surface and then spread with a KIMWIPE® cellulosic tissue commercially available from Kimberly-Clark Corporation. The tiles are then allowed to dry horizontally for 1 minute before being rinsed for 5 seconds with tap water at a flow rate of 4.5 l/min. After drying vertically for another 15 minutes, the tiles are then treated with 5 drops of a model soap scum consisting by weight of 4.6% IVORY Soap® commercially available from Procter & Gamble Co., 1.8% $MgCl_2$, 30.5% water, and 63.3% ethanol. After drying horizontally for 30 minutes, a thin white film is being formed on the surface of both halves of the tile. The tile then receives its final tap water rinse at a flow rate of 7.5 l/min for 1.5 minutes.

Following the final rinse, the side treated only with the APG solution remains unaffected whereas the side treated with the coacervate/APG solutions generally rinses clean within 30 seconds with minimal residual soap scum. Additionally, the rinsing off of the soil generally consists of whole sheets of soil lifting away.

D. Water Sheeting Effect

That test is performed by spreading (wetting) of a water droplet on a particular hydrophobic surface out of polystyrene.

The polystyrene surface has a low energy surfaces and is not wettable by water but instead have a finite contact angle with a water droplet. The polystyrene surface (contact angle with water ~90°) is immersed into the solution (1%/w) of hybrid coacervates prepared in above example 1. After evaporation of the solution, the PS substrate is rinsed with pure water and let it dry overnight.

Contact angles measurements with water are then performed. The advancing contact angle value decreases from 90° (bare polystyrene) to almost 40°. The receding contact angle is below 20°.

The invention claimed is:

1. A process for the treatment of a hard surface to deliver to the surface antifouling, water sheeting, anti-soiling, anti-adhesion, adhesion, and/or anti-deposition properties, comprising the steps of:
    a) coating on the surface a film of a composition consisting essentially of an aqueous dispersion or solution of coacervates having a core-shell structure,
        the core (a) being an aggregate of stabilized inorganic particles being anionic, and
        the shell (b) being a copolymer wherein said copolymer comprises at least two parts, A and B,
        part A being cationic, and
        part B being neutral in pH conditions of said dispersion or solution of coacervates,
    said process comprising the steps of:
    a1) preparing an aqueous colloidal dispersion of said inorganic particles whose concentration Ca by weight is equal to or less than about 2% and more than 0.001%, and setting its pH at a value of pHa,
    a2) preparing a solution of the copolymer whose concentration Cb by weight is equal to or less than about 2% and more than 0.001% with:

$Ca \times 0.95 \leq Cb \leq Ca \times 1.05$ and setting its pH at a value of pHb with:

pH$a$−2≦pH$b$≦pH$a$+2, with the further proviso that the stoichiometric ratio Z of chargeable groups present in the solution is between 0.80 and 1.2, with:

$Z:=([S] \times s)/([P] \times p)$ wherein [S] and [P] are the molar concentrations of the particle and the copolymer and s and p being the number of charge per particle and per copolymer, and
    a3) mixing the dispersion of a1) and the solution of a2) to obtain the dispersion or solution of coacervates;
        wherein the inorganic particles consist essentially of at least one member of the group consisting of $CeO_2$, aluminum oxide, zirconium oxide, phosphorus oxide, gallium oxide, germanium oxide, barium oxide, strontium oxide, yttrium oxide, antimony oxide, cesium oxide, niobium oxide, indium oxide, tantalum oxide, rare earth oxide and silicon oxide,
        wherein optionally the inorganic particles are further stabilized prior to the mixing of the aqueous colloidal dispersion of a1) and the solution of a2) to obtain the dispersion or solution of coacervates with:
        an acidic complexing agent with three or more functional groups, or
        a water-soluble or water-dispersible polymer obtained by polymerizing at least one monomer corresponding to an ethylenically unsaturated, linear or branched, aliphatic, cyclic or aromatic monocarboxylic or polycarboxylic acid, or anhydride; or obtained from the polymerization of at least one ethylenically unsaturated, linear or branched, aliphatic, cyclic or aromatic, monocarboxylic or polycarboxylic acid, or anhydride, and
    b) allowing the water of the dispersion on the hard surface to evaporate to deposit the inorganic particles and copolymer on the surface and adsorb on the surface to deliver to the surface the antifouling, water sheeting, anti-soiling, anti-adhesion, adhesion, and/or anti-deposition properties,
        wherein the inorganic particles are stabilized prior to the mixing of the aqueous colloidal dispersion of a1) and the solution of a2) to obtain the dispersion or solution of coacervates with poly(acrylic)acid so the stabilized inorganic particles are anionic, wherein the copolymer is a cationic-neutral diblock.

2. The process according to claim 1, wherein the concentration by weight of the inorganic particles and the copolymer is between 0.1 and 1, and $Ca \times 0.99 \leq Cb \leq Ca \times 1.01$ pH$a$−1≦pH$b$≦pH$a$+1, and z is 1 or about 1, and the mixing of a) and b) is carried out with a single addition step of adding together the entirety of a) with the entirety of b).

3. The process according to claim 1, wherein the inorganic particle consists of at least one member of the group consisting of $CeO_2$, aluminum oxide, zirconium oxide, phosphorus oxide, gallium oxide, germanium oxide, barium oxide, strontium oxide, yttrium oxide, antimony oxide, cesium oxide, zirconium oxide, and silicon oxide, the inorganic particle having a particle size between 1 and 100 nm.

4. The process of claim 3, wherein the inorganic particles have a particle size between 2 and 20 nm.

5. The process according to claim 1, wherein part A is polycationic and part B being neutral in pH conditions of said dispersion of coacervates.

6. The process according to claim 1, wherein the copolymer comprises a member of the group consisting of diblocks of Padamquat-b-PAM (Poly(trimethylammonium ethyl acrylate methyl sulfate)-b-PolyAcrylamide).

7. The process according to claim 1, wherein the surface is hydrophobic.

8. The process according to claim 1, wherein the stabilized inorganic particles consist essentially of CeO2, wherein the deposited and adsorbed inorganic particles and copolymer on the surface provide an anti-ultraviolet radiation coating on the surface and deliver water sheeting and anti-soiling properties to the surface.

9. The process according to claim 1, wherein the inorganic particles consist essentially of at least one member of the group consisting of CeO2, aluminum oxide, zirconium oxide, phosphorus oxide, gallium oxide, germanium oxide, barium oxide, strontium oxide, antimony oxide, cesium oxide, zirconium oxide and mixtures thereof with a particle size between 1 and 100 nm.

10. The process according to claim 1, wherein the inorganic particles consist essentially of at least one member of the group consisting of zirconium oxide, aluminum oxide and CeO2 with a particle size between 1 and 100 nm.

11. The process according to claim 1, wherein the inorganic particles consist essentially of CeO2 with a particle size between 1 and 100 nm.

12. The process according to claim 1, wherein the inorganic particles consist of CeO2 with a particle size between 1 and 100 nm.

13. The process according to claim 1, wherein the stoichiometric ratio Z of chargeable groups present in the solution is between 0.95 and 1.05.

14. The process according to claim 1, wherein the stoichiometric ratio Z of chargeable groups present in the solution is about 1.

15. The process according to claim 1, wherein the cerium inorganic particles consist of CeO2.

16. The process according to claim 1, wherein a) and b) and non-ionic surfactant are mixed to provide the dispersion or solution of coacervates with 1.5 to 10 wt. % of said non-ionic surfactant, the nonionic surfactant being a condensation product of hydrophilic alkylene oxide groups selected from the group consisting of ethylene oxide and propylene oxide, with a hydrophobic organic aliphatic or aromatic compound.

17. The process according to claim 1, wherein the inorganic particle consists of at least one member of the group consisting of CeO2, aluminum oxide, zirconium oxide, phosphorus oxide, gallium oxide, germanium oxide, barium oxide, strontium oxide, antimony oxide, cesium oxide, and silicon oxide, the inorganic particle having a particle size between 1 and 100 nm.

18. The process according to claim 1, wherein the coating comprises spraying the composition on the surface.

19. The process according to claim 1, wherein the hard surface comprises a member selected from the group consisting of glass, ceramic, and polystyrene.

20. The process according to claim 1, wherein the hard surface comprises a ceramic tile or a glass panel.

21. The process according to claim 1, wherein the hard surface comprises silica.

22. A process for providing an anti-ultraviolet radiation coating on a surface, comprising the steps of:
a) coating on the surface a film of a composition consisting essentially of an aqueous dispersion of hybrid coacervates having a core-shell structure,
  the core (a) being an aggregate of stabilized inorganic particle being anionic, and
  the shell (b) being a copolymer wherein said copolymer comprises at least two parts, A and B,
  part A being cationic, and
  part B being neutral in pH conditions of said dispersion or solution of coacervates,
  the film made by a process comprising the steps of:
a1) preparing an aqueous colloidal dispersion of said stabilized inorganic particles whose concentration Ca by weight is equal to or less than about 2% and more than 0.001%, and setting its pH at a value of pHa,
a2) preparing a solution of the copolymer whose concentration Cb by weight is equal to or less than about 2% and more than 0.001% with:

$Ca \times 0.95 < Cb < Ca \times 1.05$ and setting its pH at a value of pHb with:

$pHa-2 < pHb < pHa+2$, with the further proviso that the stoichiometric ratio Z of chargeable groups present in the solution is between 0.80 and 1.2, with:

$Z:=([S] \times s)/([P] \times p)$ wherein [S] and [P] are the molar concentrations of the particle and the copolymer and s and p being the number of charge per particle and per copolymer, and
a3) mixing the aqueous colloidal dispersion of a1) and the solution of a2) to obtain the dispersion of coacervates;
  wherein the inorganic particles consist essentially of at least one member of the group consisting of CeO2, aluminum oxide, zirconium oxide, phosphorus oxide, gallium oxide, germanium oxide, barium oxide, strontium oxide, yttrium oxide, antimony oxide, cesium oxide, niobium oxide, indium oxide, tantalum oxide, rare earth oxide and silicon oxide,
  wherein optionally the inorganic particles are further stabilized prior to the mixing of the aqueous colloidal dispersion of a1) and the solution of a2) to obtain the dispersion or solution of coacervates with:
  an acidic complexing agent with three or more functional groups, or
  a water-soluble or water-dispersible polymer obtained by polymerizing at least one monomer corresponding to an ethylenically unsaturated, linear or branched, aliphatic, cyclic or aromatic monocarboxylic or polycarboxylic acid, or anhydride; or obtained from the polymerization of at least one ethylenically unsaturated, linear or branched, aliphatic, cyclic or aromatic, monocarboxylic or polycarboxylic acid, or anhydride, and
b) allowing the water of the dispersion on the surface to evaporate to deposit the inorganic particles and copolymer on the surface and adsorb on the surface as the anti-ultraviolet radiation coating,
  wherein the inorganic particles are stabilized prior to the mixing of the aqueous colloidal dispersion of a1) and the solution of a2) to obtain the dispersion or solution of coacervates with poly(acrylic) acid so the stabilized inorganic particles are anionic, wherein the copolymer is a cationic-neutral diblock.

* * * * *